United States Patent
Huang

(10) Patent No.: US 12,536,282 B2
(45) Date of Patent: Jan. 27, 2026

(54) METHODS AND APPARATUS FOR MACHINE LEARNING BASED MALWARE DETECTION AND VISUALIZATION WITH RAW BYTES

(71) Applicant: McAfee, LLC, San Jose, CA (US)

(72) Inventor: Yonghong Huang, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 863 days.

(21) Appl. No.: 17/846,840

(22) Filed: Jun. 22, 2022

(65) Prior Publication Data

US 2022/0414219 A1 Dec. 29, 2022

Related U.S. Application Data

(60) Provisional application No. 63/214,554, filed on Jun. 24, 2021.

(51) Int. Cl.
| | | |
|---|---|---|
| *G06F 21/56* | (2013.01) | |
| *G06F 18/214* | (2023.01) | |
| *G06F 18/24* | (2023.01) | |
| *G06N 3/04* | (2023.01) | |

(Continued)

(52) U.S. Cl.
CPC .......... *G06F 21/563* (2013.01); *G06F 18/214* (2023.01); *G06F 18/24* (2023.01); *G06N 3/04* (2013.01); *G06N 3/0464* (2023.01); *G06T 11/206* (2013.01)

(58) Field of Classification Search
CPC ...... G06F 21/563; G06F 18/214; G06F 18/24; G06F 21/562; G06N 3/04; G06N 3/0464; G06N 3/09; G06N 3/048; G06N 20/10; G06T 11/206; G06T 11/00

See application file for complete search history.

(56) References Cited

U.S. PATENT DOCUMENTS 11,200,318 B2 * 12/2021 Huang .................. G06F 21/552
707/737
2019/0132334 A1 * 5/2019 Johns .................... G06F 21/562
707/737

(Continued)

OTHER PUBLICATIONS

Ganesan et al. "Robust Malware Detection using Residual Attention Network", IEEE. (Year: 2021).*

(Continued)

*Primary Examiner* — Yuk Ting Choi
(74) *Attorney, Agent, or Firm* — HANLEY, FLIGHT & ZIMMERMAN, LLC

(57) ABSTRACT

Methods, apparatus, systems, and articles of manufacture are disclosed. An example apparatus comprises at least one memory, instructions, and processor circuitry to execute the instructions. The processor circuitry executes the instructions to provide a neural network a plurality of raw bytes for malware classification. The processor circuitry executes the instructions to generate a visualization of features extracted from the plurality of raw bytes. The processor circuitry executes the instructions to generate a heatmap for the plurality of raw bytes based on gradient activations of the neural networks. The processor circuitry executes the instructions to perform a dimensionality reduction based on features of the plurality of raw bytes identified in the heatmap.

21 Claims, 14 Drawing Sheets

(51) Int. Cl.
*G06N 3/0464* (2023.01)
*G06T 11/20* (2006.01)

(56) References Cited

U.S. PATENT DOCUMENTS

| | | | |
|---|---|---|---|
| 2020/0184627 A1* | 6/2020 | Otroshi Shahreza | G06N 3/08 707/737 |
| 2022/0180528 A1* | 6/2022 | Dundar | G06N 20/00 707/737 |
| 2022/0253691 A1* | 8/2022 | Rokka Chhetri | G06F 21/566 707/737 |

OTHER PUBLICATIONS

Selvaraju, R. R. et al. "Grad-CAM: Visual Explanations from Deep Networks via Gradient-based Localization", CVF, pp. 618-626.
Maaten, L.V.D. et al. "Visualizing Data using t-SNE", Journal of Machine Learning Research 9 (2008) 2579-2605.

* cited by examiner

| C3 8B 4D 08 D1 66 C1 | → INTERESTING LOOP_TEA DECRYPTION ALGORITHM | | |
|---|---|---|---|
| 00405707: 619F | | ADD | BX,CX |
| 004057DA: AB72 | | MOV | [EBP][8],BX |
| 004057DE: BB9FB1 | | MOV | AX,BX |
| 004057E1: 8B4D08 | | MOV | ECX, [EBP][8] |
| 004057E4: 0E6405 | | ADD | EDX, ECX |
| 004057E6: 511629EE | | SHR | AX, 5 |
| 004057EA: 1E7D | | XOR | DX, AX |
| 004057ED: 435D | | SHL | ECX, 4 |
| 004057F0: 089B | | XOR | DX, CX |
| 004057F3: 0AF0 | | ADD | DI, DX |

FIG. 7

METHODS AND APPARATUS FOR MACHINE LEARNING BASED MALWARE DETECTION AND VISUALIZATION WITH RAW BYTES

RELATED APPLICATION

This patent claims the benefit of U.S. Provisional Patent Application No. 63/214,554, which was filed on Jun. 24, 2021. U.S. Provisional Patent Application No. 63/214,554 is hereby incorporated herein by reference in its entirety. Priority to U.S. Provisional Patent Application No. 63/214,554 is hereby claimed.

FIELD OF THE DISCLOSURE

This disclosure relates generally to machine learning and, more particularly, to methods and apparatus to classify and visualize malware with raw bytes.

BACKGROUND

Malware is malicious software designed to harm or exploit a programmable device or network. Malware can steal private information, hijack devices, and cause significant disruptions to computer systems. Accordingly, detection and removal of malware is of intense industrial interest.

Machine learning is a subfield of artificial intelligence that can be applied to malware detection. In machine learning, instead of providing explicit instructions, programmers use a trained machine learning model and supply data to the model. The model generates predictions and, in some examples, trains itself to improve prediction accuracy. Programmers can also adjust model parameters to further improve prediction accuracy.

BRIEF DESCRIPTION OF THE DRAWINGS

FIG. 7 is another example explainable artificial intelligence heatmap and an associated disassembly of raw bytes of the heatmap.

Figure 1:
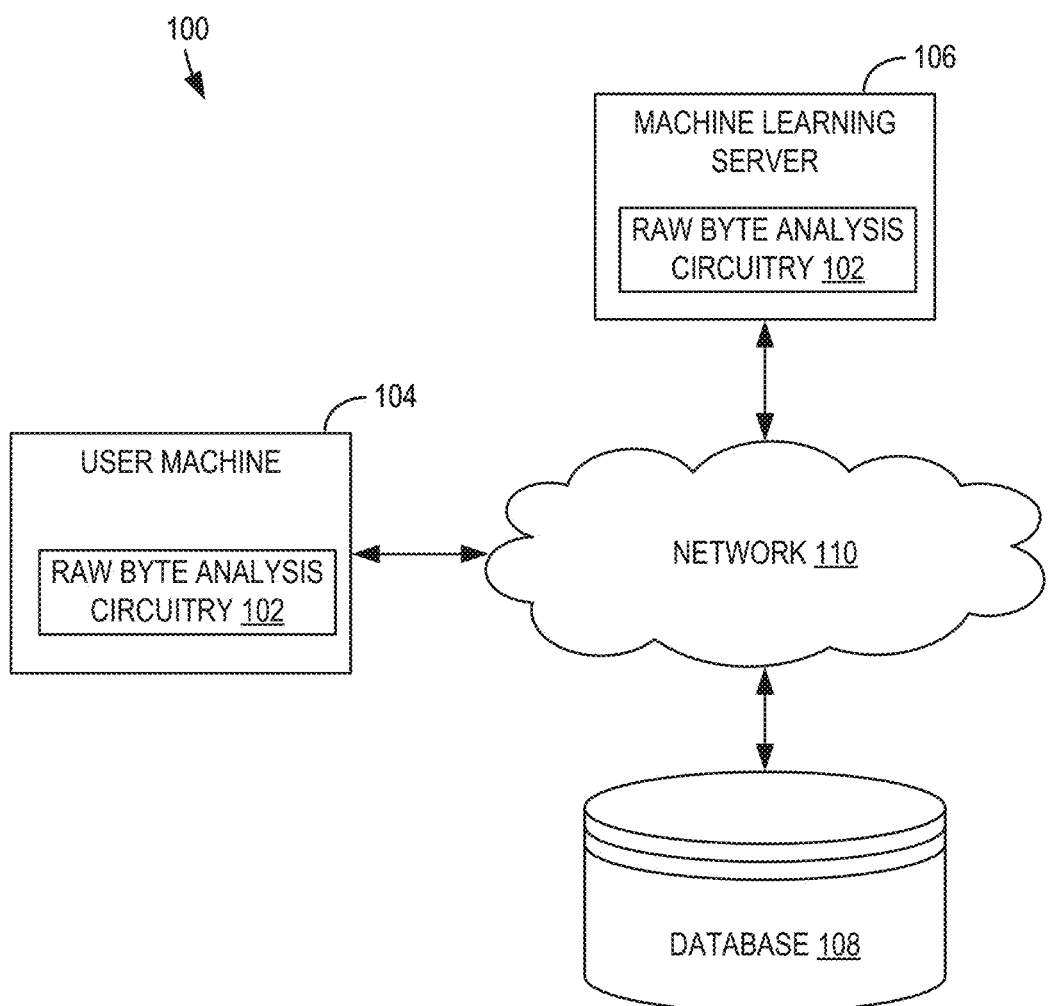
FIG. 1 is an illustration of an example computing environment to visualize raw byte based malware classification.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations when processing input data such that other input(s) result in output(s) consistent with the recognized patterns and/or associations.

Many different types of machine learning models and/or machine learning architectures exist. In some examples disclosed herein, a convolutional neural network (CNN) is used. In general, machine learning models/architectures that are suitable to use in the example approaches disclosed herein will be Convolutional Neural Network (CNN) and/or Deep Neural Network (DNN), wherein interconnections are not visible outside of the model. However, other types of machine learning models could additionally or alternatively be used such as Recurrent Neural Network (RNN), Support Vector Machine (SVM), Gated Recurrent Unit (GRU), Long Short Term Memory (LSTM), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs). In examples disclosed herein, ML/AI models are trained using labeled raw byte data (e.g., raw bytes of malware and/or clean samples) and gradient descent. However, any other training algorithm may additionally or alternatively be used.

AI and ML techniques may be applied to malware detection to provide improved accuracy compared to rule-based detection techniques. Yet, significant technical challenges arise when applying ML models to malware detection. For example, it may be challenging for researchers to troubleshoot ML model discrepancies and/or address misclassifications. ML-based systems often include models with a large number (e.g., thousands, millions) of rapidly changing weights. The rate and scale of such changes may render direct analysis impractical.

Conventional machine learning malware classification and detection approaches often rely on handcrafted features crafted in a process called feature engineering. Feature engineering is time consuming and requires significant domain expertise. Furthermore, handcrafted features may not generalize well to novel malware. These problems are compounded by the difficulty researchers have in understanding the operations a neural network takes to produce a classification. Such issues make it difficult for researchers to establish trust in machine learning models.

Explainable AI (XAI) is a field of research that seeks to solve such issues. XAI is artificial intelligence in which the results (e.g., ML model classification of malware) produced by the AI can be understood by humans. Examples disclosed herein may include XAI visualizations to help researchers and users understand and interpret predictions made by machine learning models. Example XAI visualizations disclosed herein generate visualizations of series of raw bytes and are applicable to a wide variety of ML algorithms.

In some examples, XAI visualizations (e.g., visual explanations) identify a series of raw bytes of a sample that significantly contribute to classification (e.g., important features, critical features) of the sample as malware or benign. Such an XAI visualization may be referred to herein as a heatmap. In examples disclosed herein, raw bytes that are not identified as significantly contributing to classification can be removed from datasets and/or otherwise deprioritized in later classifications. For example, raw bytes identified as insignificant may be removed from future test and/or training datasets, reducing the dimensionality of the data set. The reduced dataset contains less data than the original dataset, and can therefore be processed more efficiently.

In contrast to conventional solutions, disclosed examples provide visual explanations for deep learning models performing inference on raw byte malware representations. Some examples generate a heatmap to guide dimensionality reduction of input data. Such dimensionality reduction makes deep learning based raw byte malware classification feasible in real-world security applications. For example, reducing the dimensionality of raw byte input data can reduce a computational cost and storage space required to classify the raw bytes.

Furthermore, analysis of raw bytes (e.g., rather than active processes) protects client privacy as the raw bytes are not human understandable. In some examples, a raw byte model is generated at both cloud and client side to further protect client privacy.

Thus, in order to build trust in deep learning-based malware classification, disclosed examples provide visual explanations to make AI models transparent, allow researchers to trust machine learning models, and explain deep learning models. Additionally, disclosed examples identify important features of raw byte sample data and develop a heatmap of the raw bytes to guide dimensionality reduction.

Turning to the figures, FIG. 1 is an illustration of an example system 100 to visualize machine-learning based malware classification. The system 100 includes example raw byte analysis circuitry 102, an example user machine 104, an example machine learning server 106, an example database 108, and an example network 110.

The example raw byte analysis circuitry 102 may: (1) perform visualizations (before-and-after training) of a CNN, the visualizations based on a feature projection (e.g., T-SNE and/or PCA); (2) generate a heatmap using one-dimensional (1-D) GRAD-CAM; and (3) perform a dimensionality reduction based on the heatmaps. In some examples, the dimensionality reduction is further guided by a disassembly of raw bytes identified in the heatmap. In some examples, the raw byte analysis circuitry 102 may perform classification and/or dimensionality reduction without an accompanying visualization. The structure and function of the example raw byte analysis circuitry 102 will be described in further detail in association with FIG. 2.

In the example of FIG. 1, a separate instance of the raw byte analysis circuitry 102 is included in each of the user machine 104 and the machine learning server 106. However, in some examples the raw byte analysis circuitry 102 may not be included in one or more of the user machine 104 and/or the machine learning server 106.

The example system 100 includes the example user machine 104. The example user machine 104 is a user machine that includes malware detection software. For example, the user machine 104 may include malware detection software that analyzes raw bytes and classifies the raw bytes as malware or benign.

The example user machine 104 stores raw bytes for malware classification on-device. However, in some examples, raw bytes for training and/or classification may be stored in the example database 108 and transferred to the example user machine 104 via the network 110.

The example user machine 104 may be associated with a user (e.g., a security researcher). In such an example, the first instantiation of the raw byte analysis circuitry 102 may generate visual explanations, heatmaps, classification results, guide dimensionality reduction, and/or provide other relevant information regarding raw bytes to the example user. For example, the user machine 104 may include a graphical user interface to display the results of the raw byte analysis, display heatmaps, display visual explanations of a neural network used to classify the raw bytes, and/or display suggestions to guide dimensionality reduction.

The example system 100 includes the example machine learning server 106. The example machine learning server 106 includes a second instantiation of the example raw byte analysis circuitry 102. The machine learning server 106 may be a dedicated machine learning server including AI accelerator application-specific integrated circuits (ASICs), graphical processing units (GPUs), etc. In some examples, the machine learning server may be a cloud resource providing on-demand availability of computer resources. Thus, the machine learning server may support functions of the user machine 104 such as classification of a series of raw bytes as benign or malware.

The example machine learning server 106 may coordinate with the example database 108 to load and/or store data. For example, the machine learning server 106 may retrieve a first set of samples of known malware, a second set of samples that are known not to contain malware, and other information associated with either the first or the second set of samples. Such information can be used to train a machine learning model (e.g., a convolutional neural network) to recognize raw bytes as malware/benign, or otherwise classify malware (e.g., into a family of malware).

The network 110 facilitates communication between the user machine 104, the machine learning server 106, and the database 108. The network 110 may be, for example, the Internet. In some examples, the network 110 may be a local area network.

Figure 2:
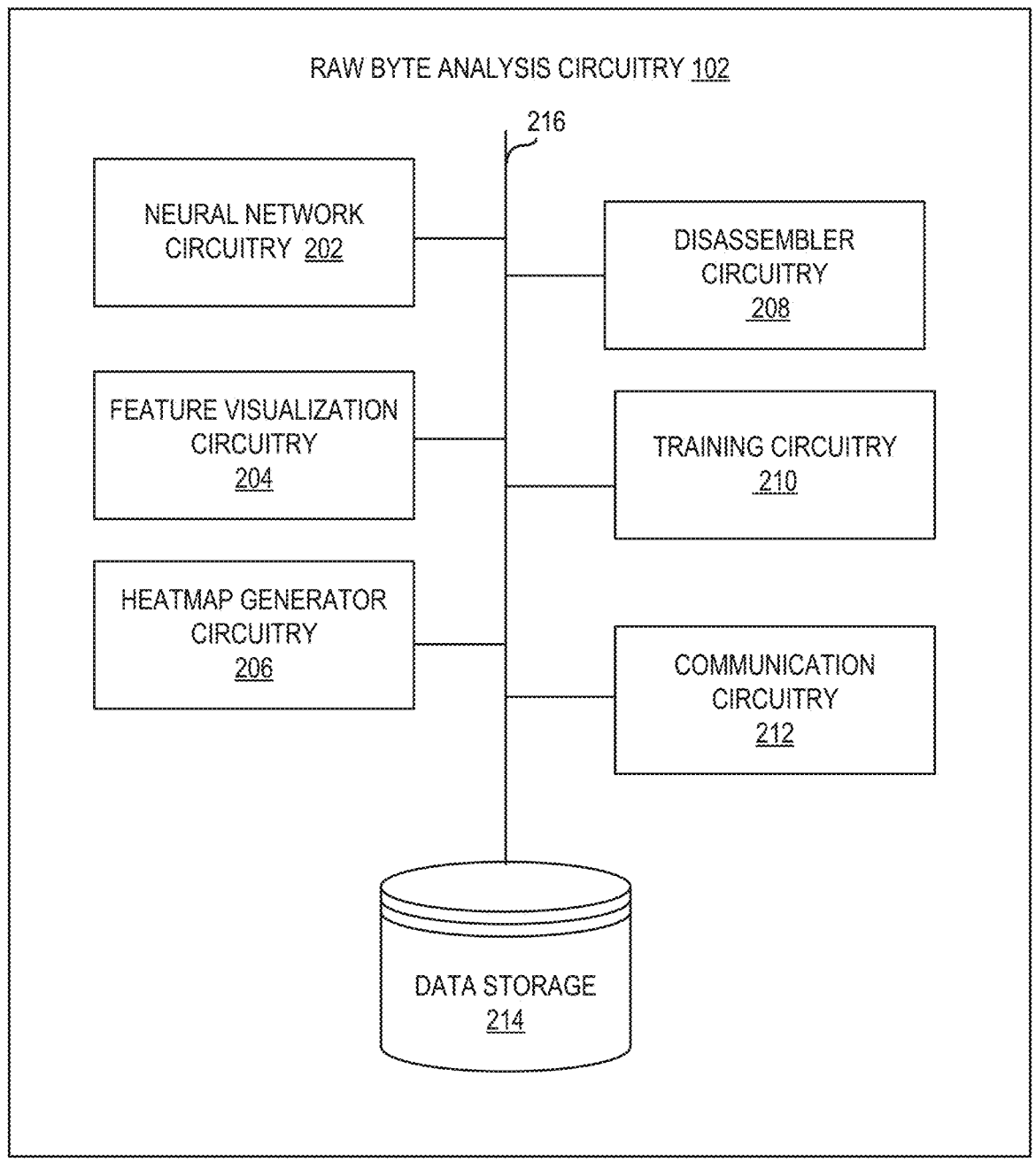
FIG. 2 is a block diagram of example raw byte analysis circuitry of FIG. 1.

FIG. 2 is a block diagram of the example raw byte analysis circuitry 102 to perform inference on raw bytes, provide visual explanations of a machine learning model that performs the inference, train the machine learning model, generate heatmaps, and communicate with outside servers. The example raw byte analysis circuitry 102 includes example neural network circuitry 202, example feature visualization circuitry 204, example heatmap generator circuitry 206, example disassembler circuitry 208, example training circuitry 210, and example communication circuitry 212. The raw byte analysis circuitry 102 of FIG. 2 may be instantiated (e.g., creating an instance of, bring into being for any length of time, materialize, implement, etc.) by processor circuitry such as a central processing unit executing instructions. Additionally or alternatively, the raw byte analysis circuitry 102 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example raw byte analysis circuitry 102 includes the neural network circuitry 202. The neural network circuitry 202 implements a convolutional neural network that includes various convolutional layers, max pooling layers, fixed embedding layers, and global averaging layers. Specifically, the example neural network circuitry 202 includes four convolutional layers with rectified linear unit activation functions, and four fully connected layers with scaled exponential linear unit activation functions.

Various layers of the example neural network circuitry 202 may be visualized by the example feature visualization circuitry 204 and/or the example heatmap generator circuitry 206. Such visualizations provides a visual explanation of the neural network circuitry 202 and facilitate effective troubleshooting of the example neural network circuitry 202. The structure of the example neural network circuitry 202 will be described in further detail in association with FIG. 4.

In operation, the example neural network circuitry 202 performs classification of raw bytes. For example, the neural network circuitry 202 may classify a series of raw bytes as benign or malware. The example neural network circuitry 202 may also output a classification of raw bytes into a family of malware.

In some examples, the example neural network circuitry 202 may include additional and/or alternative machine learning models to predict a class label for a given example input data. For example, the neural network circuitry 202 may interoperate with any other classification algorithm (e.g., logistic regression, naive bayes, k-nearest neighbors, decision tree, support vector machine) to provide improved classification results. Additionally, the example neural network circuitry 202 may be repurposed to process input data that is not in raw byte format.

Figure 9:
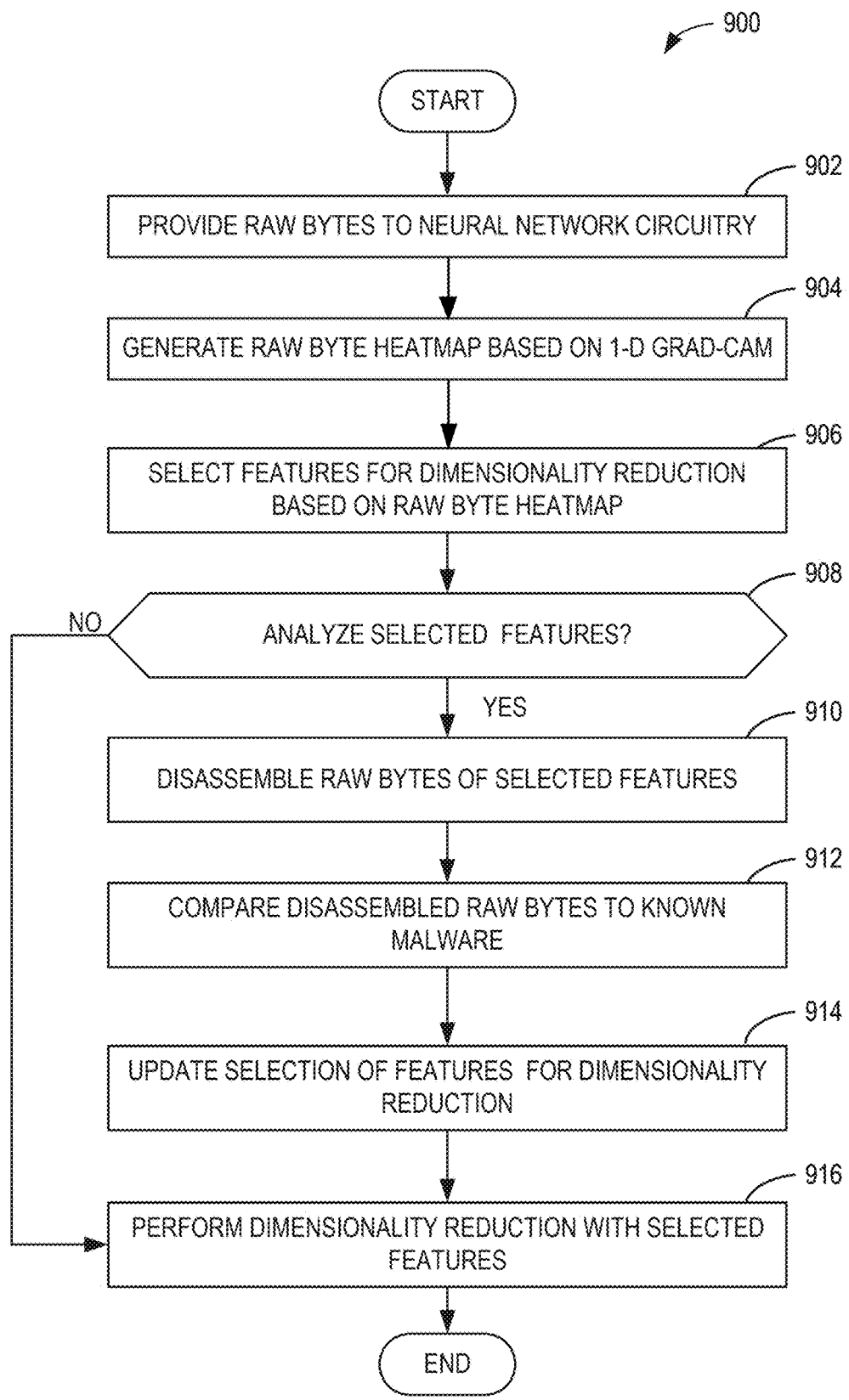
FIG. 9 is a flowchart representative of example machine readable instructions and/or example operations that may be executed by example processor circuitry to implement the raw byte analysis circuitry of FIG. 2.
Figure 10:
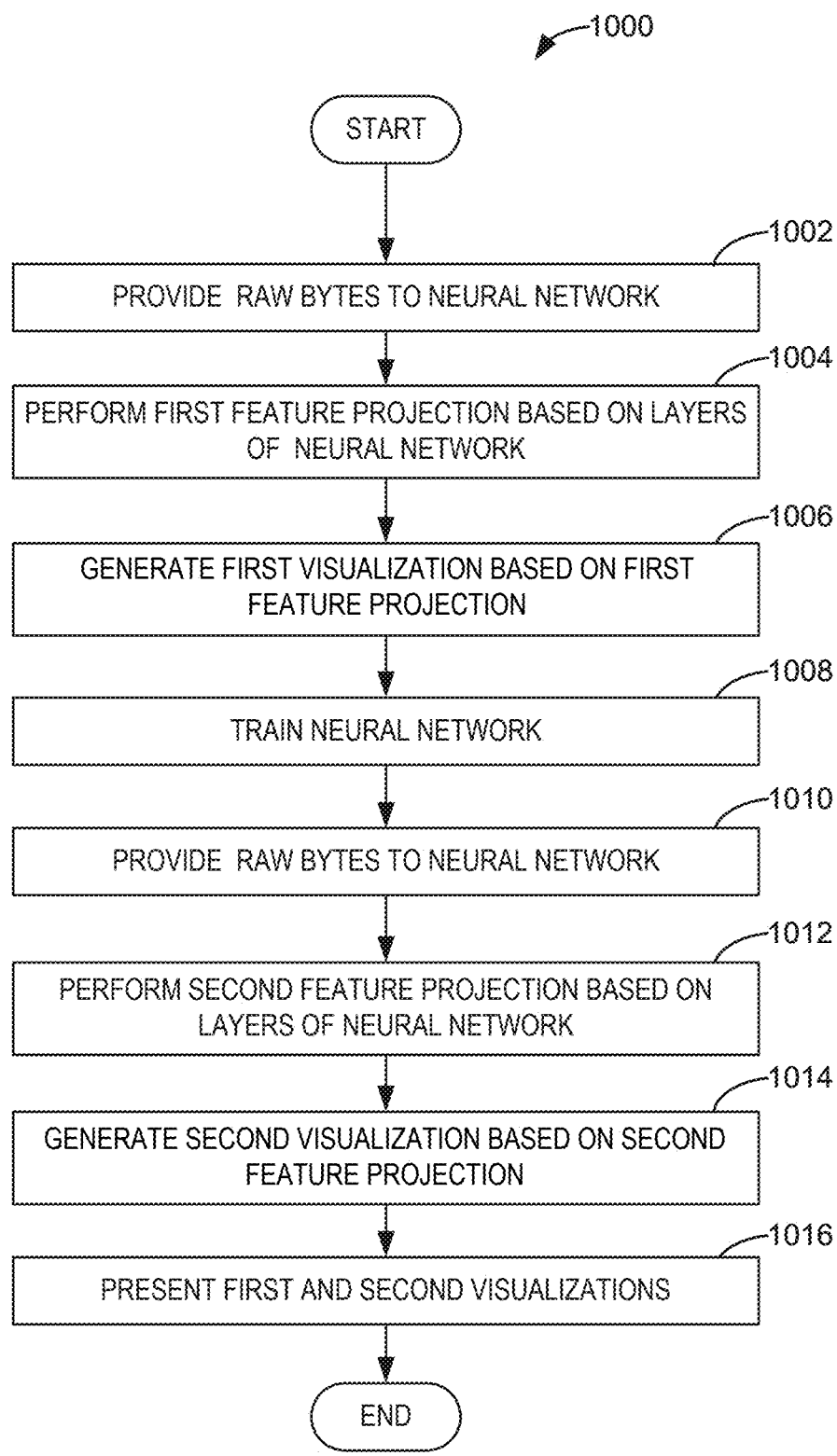
FIG. 10 is a flowchart representative of example machine readable instructions and/or example operations that may be executed by example processor circuitry to implement the heatmap generator circuitry of FIG. 2.

In some examples, the neural network circuitry 202 is instantiated by processor circuitry executing neural network instructions and/or configured to perform operations such as those represented by the flowcharts of FIGS. 9-10.

In some examples, the raw byte analysis circuitry 102 includes means for classifying raw bytes as malware or benign. For example, the means for classifying may be implemented by the example neural network circuitry 202. In some examples, the neural network circuitry 202 may be instantiated by processor circuitry such as the example processor circuitry 1112 of FIG. 11. For instance, the neural network circuitry 202 may be instantiated by the example microprocessor 1200 of FIG. 12 executing machine executable instructions such as those implemented by at least blocks 1002 of FIG. 10. In some examples, the neural network circuitry 202 may be instantiated by hardware logic circuitry, which may be implemented by an ASIC, XPU, or the FPGA circuitry 1300 of FIG. 13 structured to perform operations corresponding to the machine readable instructions. Additionally or alternatively, the neural network circuitry 202 may be instantiated by any other combination of hardware, software, and/or firmware. For example, the neural network circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example raw byte analysis circuitry 102 includes the example feature visualization circuitry 204. The feature visualization circuitry 204 causes presentation of a visualization of raw bytes being processed by the example neural network circuitry 202.

The example feature visualization circuitry 204 may base visualizations (e.g., feature importance visualizations) on algorithms such as shapley additive explanations (SHAP) and/or gradient-weighted class activation mapping (Grad-CAM) that visualize the relationship between feature importance (e.g., feature ranking) and model decision making. Such visualizations provide model interpretability information and visualize how a ML model makes decisions in feature/embedding space. The feature visualization circuitry 204 may help a user understand class similarity for high dimensionality data (e.g., through dimensionality reduction).

In some examples the feature visualization circuitry 204 may generate visualizations based on a flatten layer and a first three fully connected layers of four fully connected layers of the neural network circuitry 202. The visualizations may be based on t-distributed stochastic neighbor embedding (t-SNE), for example. In some examples, the feature visualization circuitry 204 may generate a visualization based on an output of a last convolutional layer of the example neural network circuitry 202.

The example feature visualization circuitry 204 may perform a first visualization on the example neural network circuitry 202 before training. The example feature visualization circuitry 204 may additionally generate a second visualization of the example neural network after training. The first and second visualizations may be included in a third (e.g., a comparative) visualization generated by the example feature visualization circuitry 204. The comparison may be used to determine how training has changed the example neural network circuitry 202 and/or to guide optimization of the example neural network circuitry 202. In some examples, the third visualization may include highlighting and/or other indicators to show the differences between the first and second visualization.

In some examples, the feature visualization circuitry 204 is instantiated by processor circuitry executing feature visualization instructions and/or configured to perform operations such as those represented by the flowchart of FIGS. 9-10.

In some examples, the raw byte analysis circuitry 102 includes means for generating a visualization of features extracted from a plurality of raw bytes. For example, the means for generating may be implemented by the example feature visualization circuitry 204. In some examples, the feature visualization circuitry 204 may be instantiated by processor circuitry such as the example processor circuitry 1112 of FIG. 11. For instance, the feature visualization circuitry 204 may be instantiated by the example microprocessor 1200 of FIG. 12 executing machine executable instructions such as those implemented by at least blocks 1002 of FIG. 10. In some examples, the feature visualization circuitry 204 may be instantiated by hardware logic circuitry, which may be implemented by an ASIC, XPU, or the FPGA circuitry 1300 of FIG. 13 structured to perform operations corresponding to the machine readable instructions. Additionally or alternatively, the feature visualization circuitry 204 may be instantiated by any other combination of hardware, software, and/or firmware. For example, feature visualization circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example raw byte analysis circuitry 102 includes the example heatmap generator circuitry 206. The example heatmap generator circuitry 206 generates a heatmap for a sample of raw bytes that have been processed by the example neural network circuitry 202.

Raw byte samples do not include spatial information (e.g., as in an image), and therefore conventional two-dimensional Grad-CAM techniques cannot be used to interpret gradient activations of the example raw byte analysis circuitry 102. Instead, the example heatmap generator circuitry 206 performs a modified one-dimensional Grad-CAM to visualize gradient activations for CNN malware classifications.

The example heatmap generator circuitry generates heatmaps that may include some or all bytes of a sample data set. In some examples, the raw bytes of a plurality of raw bytes in the data set are assigned an importance value. The significance value (e.g., activation value, importance value) indicates how significant the respective raw byte of the heatmap is to gradient activations of the neural network. In some examples, the significance value is associated with a color, a brightness, a highlight, and/or any other indicator to visualize the importance of the heatmap. Example heatmaps will be presented and described in FIGS. 5-7.

In some examples, the raw byte analysis circuitry 102 includes means for generating a heatmap for the plurality of raw bytes based on gradient activations of the neural network. For example, the means for generating may be implemented by the example heatmap generator circuitry 206. In some examples, the heatmap generator circuitry 206 may be instantiated by processor circuitry such as the example processor circuitry 1112 of FIG. 11. For instance, the heatmap generator circuitry 206 may be instantiated by the example microprocessor 1200 of FIG. 12 executing machine executable instructions such as those implemented by at least blocks 1002 of FIG. 10. In some examples, the heatmap generator circuitry 206 may be instantiated by hardware logic circuitry, which may be implemented by an ASIC, XPU, or the FPGA circuitry 1300 of FIG. 13 structured to perform operations corresponding to the machine readable instructions. Additionally or alternatively, the heatmap generator circuitry 206 may be instantiated by any other combination of hardware, software, and/or firmware. For example, heatmap generator circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example raw byte analysis circuitry 102 includes the disassembler circuitry 208. The disassembler circuitry 208 receives raw bytes with high significance values (e.g., significantly contribute to gradient activations) from the heatmap generator circuitry 206. For example, raw bytes for disassembly may be selected based on a threshold significance value, with contiguous bytes that exceed the significance value selected for disassembly.

Raw bytes are not easily human-understandable, as many researchers are not trained to interpret binary values of raw bytes directly. To present a human-interpretable representation of significant series of raw bytes of the heatmap, the example disassembler circuitry 208 can perform a disassembly on a contiguous plurality of the raw bytes. For example, the disassembler circuitry 208 may convert the machine language (e.g., raw bytes) of the contiguous plurality of raw bytes into assembly language. Assembly language is more human-interpretable than machine language. Thus, the raw byte analysis circuitry 102 presents segments of the raw byte heatmap that significantly contribute to gradient activations and converts the segments into a form that can be more easily interpreted.

Visualizations generated by the example disassembler circuitry 208 and/or the example heatmap generator circuitry 206 may guide feature selection and/or dimensionality reduction. For example, input data of a first size may be reduced to a second size, the second size smaller than the first, by removing features with low significance values. Additionally or alternatively, features with high significance values can be selected to form the basis of a new data set of reduced size. The reduced set of features may also improve training speed. Data from the example heatmap generator circuitry 206 and/or the example disassembler circuitry 208 may be provided to the example training circuitry 210 to guide feature selection. In some examples, the disassembler circuitry 208 may include a graphical user interface that includes one or more columns with raw bytes, and one or more columns with corresponding disassembled instructions.

Figure 11:
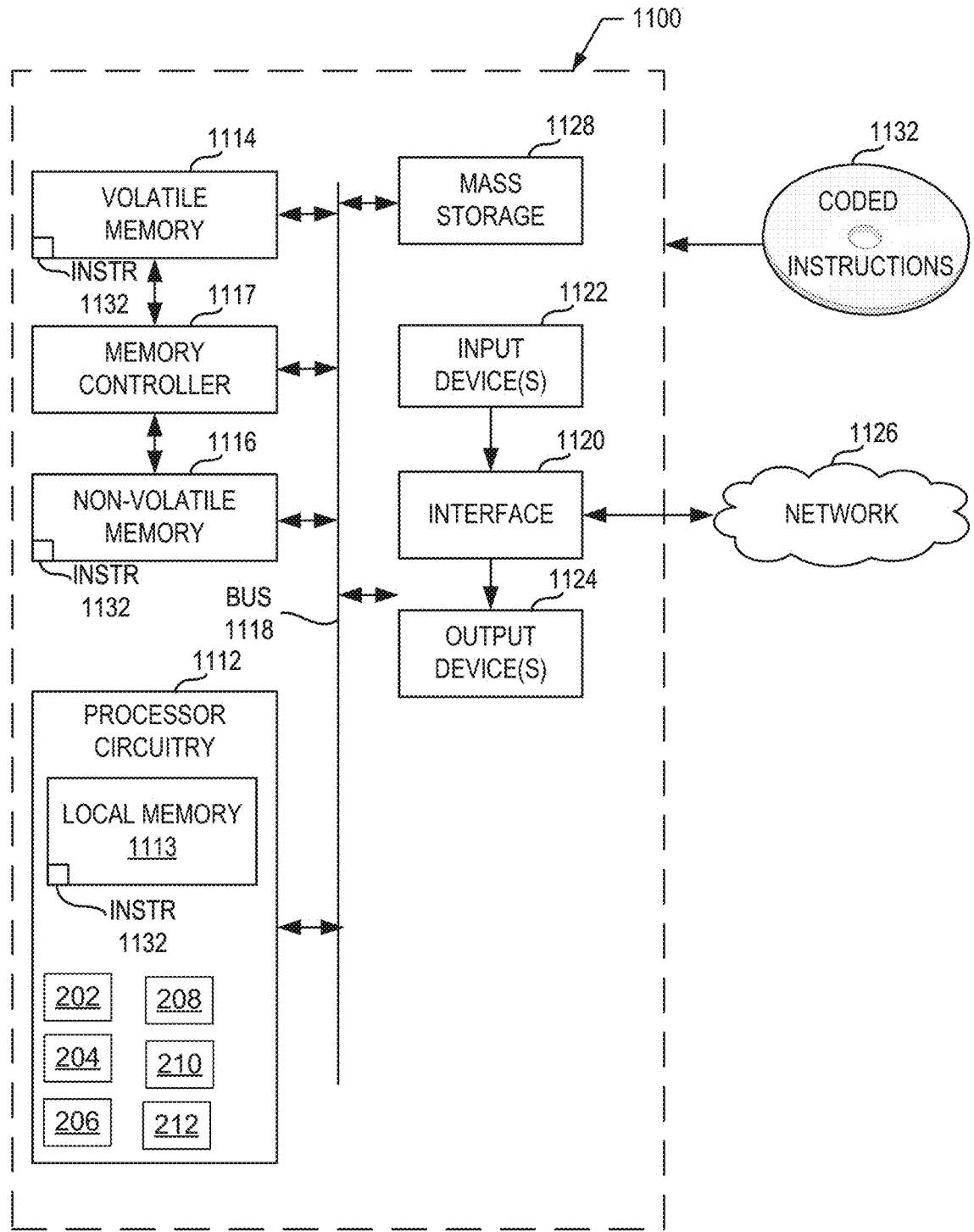
FIG. 11 is a block diagram of an example processing platform including processor circuitry structured to execute the example machine readable instructions and/or the example operations of FIGS. 9-10 to implement the raw byte analysis circuitry of FIG. 2.

In some examples, the disassembler circuitry 208 is instantiated by processor circuitry executing disassembler instructions and/or configured to perform operations such as those represented by the flowchart of FIGS. 10-11.

In some examples, the disassembler circuitry 208 includes means for disassembling a subset of the raw bytes, the subset selected based on a heatmap. For example, the means for disassembling may be implemented by the example disassembler circuitry 208. In some examples, the disassembler circuitry 208 may be instantiated by processor circuitry such as the example processor circuitry 1112 of FIG. 11. For instance, disassembler circuitry 208 may be instantiated by the example microprocessor 1200 of FIG. 12 executing machine executable instructions such as those implemented by at least blocks 908-914 of FIG. 9. In some examples, the disassembler circuitry 208 may be instantiated by hardware logic circuitry, which may be implemented by an ASIC, XPU, or the FPGA circuitry 1300 of FIG. 13 structured to perform operations corresponding to the machine readable instructions. Additionally or alternatively, the disassembler circuitry 208 may be instantiated by any other combination of hardware, software, and/or firmware. For example, disassembler circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example raw byte analysis circuitry 102 includes the example training circuitry 210. The example training circuitry 210 may train the example neural network circuitry 202 to classify series of raw bytes as malware or benign. In some examples, the neural network circuitry 202 may be initialized with random weights. The example training circuitry 210 then feeds the example neural network circuitry 202 with labeled test data (e.g., series of raw bytes labeled as malware or benign) and adjusts the weights to produce results consistent with the labeled test data (e.g., minimizing loss function). The weights may be adjusted based on gradient descent or any other suitable optimization algorithm.

The example training circuitry 210 may retrieve raw byte training data from the example data storage 214 and use the retrieved data to train the example neural network circuitry 202. In some examples, the training circuitry 210 may perform pre-processing on the training data before providing the training data to the example neural network circuitry 202. For example, the training circuitry 210 may perform a feature selection on training set data, the feature selection guided by a heatmap of the example heatmap generator circuitry 206. In some examples, raw bytes that have a significance value lower than a threshold may be removed from a training set to reduce the training set size and improve an efficiency of the example neural network circuitry 202. In some examples, the training circuitry 210 may deduplicate elements of the training set.

In some examples, the training circuitry 210 is instantiated by processor circuitry executing disassembler instructions and/or configured to perform operations such as those represented by the flowchart of FIGS. 10-11.

In some examples, the raw byte analysis circuitry 102 includes means for training neural network circuitry. For example, the means for training may be implemented by the example training circuitry 210. In some examples, the training circuitry 210 may be instantiated by processor circuitry such as the example processor circuitry 1112 of FIG. 11. For instance, training circuitry 210 may be instantiated by the example microprocessor 1200 of FIG. 12 executing machine executable instructions such as those implemented by at least block 1008 of FIG. 10. In some examples, the training circuitry 210 may be instantiated by hardware logic circuitry, which may be implemented by an ASIC, XPU, or the FPGA circuitry 1300 of FIG. 13 structured to perform operations corresponding to the machine readable instructions. Additionally or alternatively, the training circuitry 210 may be instantiated by any other combination of hardware, software, and/or firmware. For example, training circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example raw byte analysis circuitry 102 includes the example communication circuitry 212. The example communication circuitry 212 transmits and/or receives information from the example raw byte analysis circuitry 102 to/from external compute devices. For example, a user machine running malware detection software (e.g., the user machine 104 of FIG. 1) may communicate with a server (e.g., the example machine learning server 106 of FIG. 1) to transmit training data, classification results, and/or raw byte analysis to the server. In some examples, the example communication circuitry 212 may transmit and/or receive a model for the example neural network circuitry 202. For example, the neural network circuitry 202 may transmit a model to a machine learning server for training of the model. In such an example, the communication circuitry 212 may receive a trained machine learning model with which the example raw byte analysis circuitry 102 can perform inference, visualize raw bytes, perform dimensionality reduction, etc.

The example communication circuitry 212 additionally may coordinate communication between the neural network circuitry 202, the feature visualization circuitry 204, the example heatmap generator circuitry 206, the disassembler circuitry 208, the training circuitry 210, and the data storage 214.

In some examples, the communication circuitry 212 is instantiated by processor circuitry executing communication instructions and/or configured to perform operations such as those represented by the flowchart of FIGS. 10-11.

In some examples, the example raw byte analysis circuitry 102 includes means for transmitting and/or receiving a neural network. For example, the means for transmitting may be implemented by communication circuitry 212. In some examples, the communication circuitry 212 may be instantiated by processor circuitry such as the example processor circuitry 1112 of FIG. 11. For instance, communication circuitry 212 may be instantiated by the example microprocessor 1200 of FIG. 12 executing machine executable instructions such as those implemented by at least blocks 1008 of FIG. 10. In some examples, communication circuitry 212 may be instantiated by hardware logic circuitry, which may be implemented by an ASIC, XPU, or the FPGA circuitry 1300 of FIG. 13 structured to perform operations corresponding to the machine readable instructions. Additionally or alternatively, the communication circuitry 212 may be instantiated by any other combination of hardware, software, and/or firmware. For example, communication circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example raw byte analysis circuitry 102 includes the example data storage 214. The example data storage 214 stores training data for training the example neural network circuitry 202. The example data storage 214 can also store results of classifications of raw bytes performed by the example neural network circuitry 202, the example heatmap generator circuitry 206, and/or the example disassembler circuitry 208.

The example data storage 214 can also store historical data and/or visualizations produced by the example neural network circuitry 202, the example heatmap generator circuitry 206, and/or the example disassembler circuitry 208.

Such historical data can be added into visualizations performed by the example feature visualization circuitry 204, for example.

In some examples, the data storage 214 is instantiated by processor circuitry executing data storage instructions and/or configured to perform operations such as those represented by the flowchart of FIGS. 10-11.

In some examples, the example neural network circuitry 202 includes means for storing raw bytes. For example, the means for storing may be implemented by the example data storage 214. In some examples, the example data storage 214 may be instantiated by processor circuitry such as the example processor circuitry 1112 of FIG. 11. For instance, example data storage 214 may be instantiated by the example microprocessor 1200 of FIG. 12 executing machine executable instructions such as those implemented by at least blocks 1002 of FIG. 10. In some examples, example data storage 214 may be instantiated by hardware logic circuitry, which may be implemented by an ASIC, XPU, or the FPGA circuitry 1300 of FIG. 13 structured to perform operations corresponding to the machine readable instructions. Additionally or alternatively, the example data storage 214 may be instantiated by any other combination of hardware, software, and/or firmware. For example, example data storage 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the raw byte analysis circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example neural network circuitry 202, the example feature visualization circuitry 204, the example heatmap generator circuitry 206, the example disassembler circuitry 208, the example training circuitry 210, the example communication circuitry 212, and/or the example data storage 214 may be implemented by hardware alone or by hardware in combination with software and/or firmware. Thus, for example, any of the example neural network circuitry 202, the example feature visualization circuitry 204, the example heatmap generator circuitry 206, the example disassembler circuitry 208, the example training circuitry 210, the example communication circuitry 212, and/or the example data storage 214 and/or, more generally, the example raw byte analysis circuitry 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example raw byte analysis circuitry 102 of FIG. 1 may include one or more elements, processes, and/or devices in addition to, or instead of, those illustrated in FIG. 2, and/or may include more than one of any or all of the illustrated elements, processes and devices.

Figure 3A:
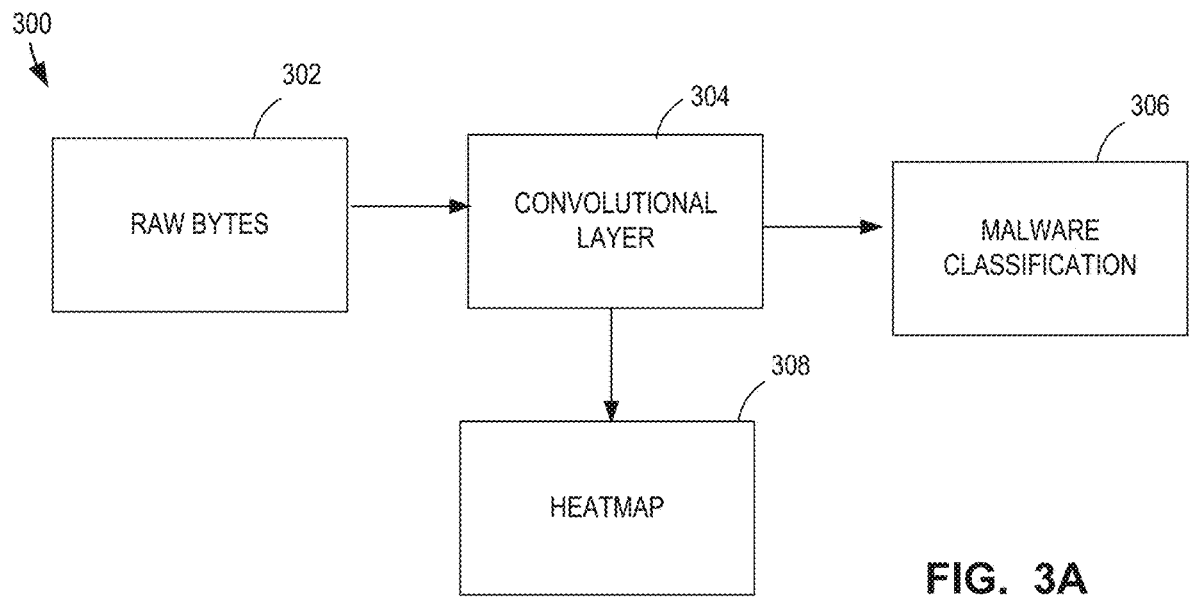
FIG. 3A is a block diagram of an example raw byte classification system to classify samples as clean or malicious and generate a heatmap.

FIG. 3A is a block diagram of portions of an example first raw-byte classification system 300. The example first raw byte classification system 300 includes example raw bytes 302, an example convolutional layer 304, an example malware classification 306, and an example heatmap 308. The example raw byte classification system 300 receives the raw bytes 302. The example raw byte classification system 300 then provides the raw bytes 302 to a neural network that includes the example convolutional layer 304. A heatmap 308 is generated by, for example, heatmap generator circuitry 206 of FIG. 2 and performs inference on the raw bytes in a convolutional neural network. Example heatmaps are illustrated and described in association with FIGS. 5-7.

Figure 3B:
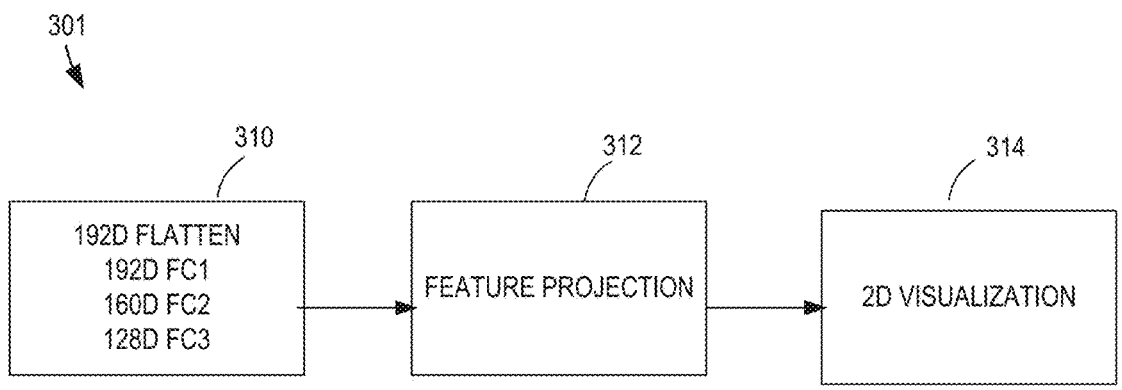
FIG. 3B is a block diagram of an example raw byte classification system to classify samples as clean or malicious and generate a two-dimensional visualization.

FIG. 3B is a block diagram of an example second raw byte classification system 301 to generate visual explanations of example raw bytes. The example second raw byte classification system 301 includes example layers 310, example feature projection 312, and an example two-dimensional (2D) visualization 314. The example layers include a 192-dimension flatten layer ("192D Flatten"), a 192-dimension first fully connected layer ("192D FC1"), a 160-dimension second fully connected layer ("160D FC2"), and a 128-dimension third fully connected layer ("128D FC3"). The high-dimensional input layers of the example layers 310 are not suitable for a two-dimensional visualization (e.g., the example 2D visualization 314). Therefore, a feature projection is performed at block 312 to reduce the dimensionality of the layers 310 and generate a 2-D visualization 314 (e.g., an XAI visualization).

Figure 4:
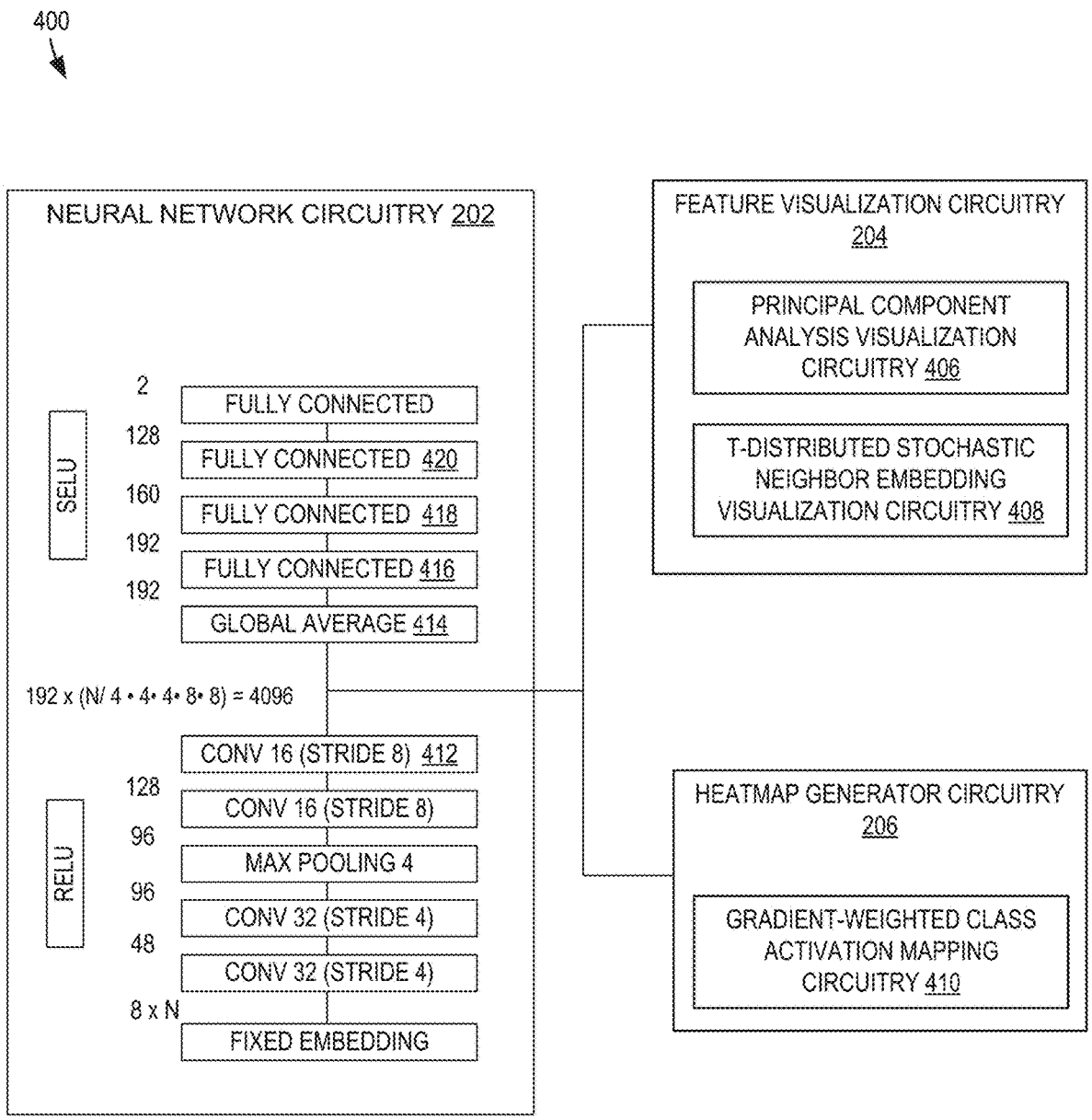
FIG. 4 is an example block diagram showing example connections between the example neural network, feature visualization circuitry, and heatmap generator circuitry of FIG. 2.

FIG. 4 is a block diagram of an example neural network classification and visualization architecture 400. The example architecture 400 includes the example neural network circuitry 202, the example feature visualization circuitry 204, and the example heatmap generator circuitry 206 of FIG. 2.

The example neural network circuitry 202 is a convolutional neural network that includes a plurality of layers including a final convolutional layer 412, a global average layer 414, a first fully connected layer 416, a second fully connected layer 418, and a third fully connected layer 420.

In some examples, an output of the final convolutional layer 412 is provided to the example heatmap generator circuitry 206 and/or the example feature visualization circuitry 204. The example heatmap generator circuitry 206 includes the example gradient-weighted class activation mapping (Grad-CAM) circuitry 410. The example Grad-CAM circuitry 410 uses the gradients of the example final convolutional layer 412 to generate a visual explanation of significant features of the example raw bytes based on a the Grad-CAM circuitry 410. In some examples, the heatmap generator circuitry 206 may be connected to additional convolutional layers (e.g., one or more of the example fully connected layers 416-420). In such an example, the Grad-CAM circuitry 410 may perform multiple iterations of 1-D Grad-CAM operations and produce a plurality of heatmaps. In some examples, the plurality of heatmaps may be overlayed to illustrate gradient activations as a sample of raw bytes travel through various layers of the neural network circuitry 202.

The output of the final convolutional layer 412 is flattened at the global average layer 414. The example global average layer 414 takes a tensor from the example final convolutional layer 412 and transforms the tensor into a one-dimensional tensor. The one-dimensional tensor then travels through the example first fully connected layer 416, the example second fully connected layer 418, and the example third fully connected layer 420. Each of the global average layer 414, the example first fully connected layer 416, the example second fully connected layer 418, and the example third fully connected layer 420 are connected to the example feature visualization circuitry 204.

The example feature visualization circuitry 204 includes the example principal component analysis (PCA) visualization circuitry 406 and the example t-distributed stochastic neighbor embedding (t-SNE) visualization circuitry 408. In some examples, the t-SNE visualization circuitry 408 and/or the example PCA visualization circuitry 406 may perform a visualization based on a final convolutional layer 412 of the example neural network circuitry 202. The example PCA visualization circuitry 406 and the example t-SNE visualization circuitry 408 may also perform dimensionality reduction on tensors of data in the global average layer 414, the example first fully connected layer 416, the example second fully connected layer 418, and the example third fully connected layer 420. PCA and t-SNE reduce the dimensionality of the fully connected layers (and/or the example convolutional layers) to allow representation of the final convolutional layer and/or the fully connected layers in a two-dimensional visualization. The example feature visualization circuitry 204 may generate a feature visualization for each of the global average layer 414, the example first fully connected layer 416, the example second fully connected layer 418, and the example third fully connected layer 420. In some examples, the example feature visualization circuitry 204 may generate first and second feature visualizations (e.g., before and after training), and then generate an additional visualization that highlights the differences between the feature visualizations.

Figure 5:
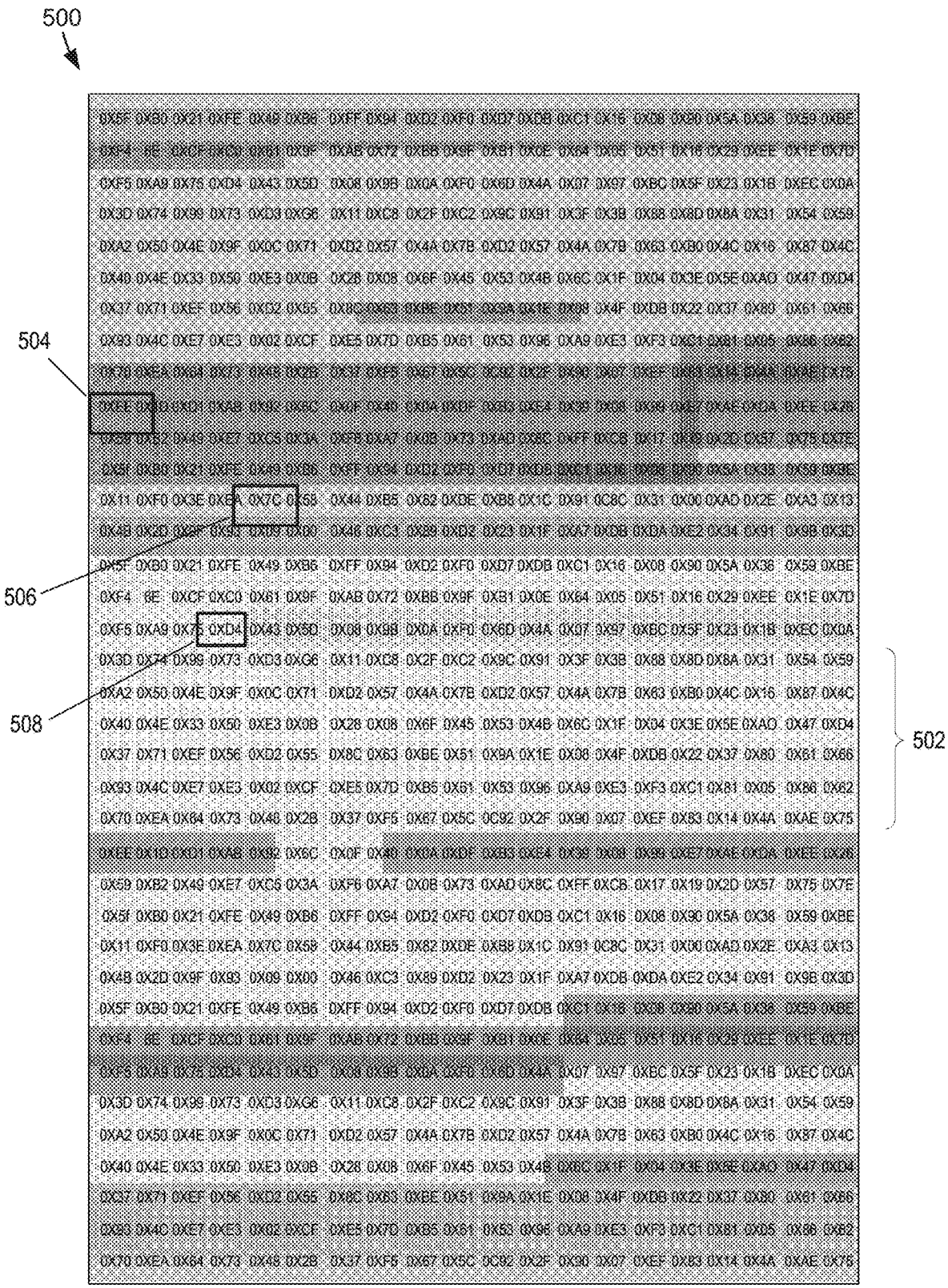
FIG. 5 is an example explainable artificial intelligence heatmap for a raw byte sequence.

FIG. 5 is an example first heatmap 500 generated by the heatmap generator circuitry 206 of FIG. 2. The example first heatmap 500 includes a series of raw bytes organized into rows and columns. For example, the first heatmap 500 includes an example first plurality of bytes 502, an example byte 504, an example second byte 506, and an example third byte 508.

The example first heatmap 500 assigns a significance value to each byte of the heatmap indicating a significance of the byte to activations of the neural network circuitry 202. The example first heatmap 500 assigns a color to each byte that indicates the significance of the byte. For example, the first byte 504 appears as a darker color than the example second byte 506 and the example third byte 508. The darker color indicates a lesser significance value and less contribution to gradient activations of example neural network circuitry. In some examples, the heat map may use other color gradients and/or another range of colors to differentiate between bytes. In some examples, other indicators may be used by the example heatmap generator circuitry to indicate significance of bits in a heatmap. For example, a brightness of pixels on a digital display, highlights, visual patterns, and/or any other type of indicator may be used to differentiate bytes that provide a greater contribution to gradient activation than other bytes of the heatmap 500.

The example second byte 506 is assigned a lighter color than the example first byte 504, indicating a greater significance (e.g., more effect on gradient activations) than the example first byte 504. The example third byte 508 is assigned a lighter color than the example second byte 506. The example third byte 508 contributes more significantly to gradient activations than the example first byte 504 or the example second byte 506. Therefore, the example third byte 508 is set forth as a byte that is indicative of malware.

The example first plurality of bytes 502 is a series of bytes that generally are of higher significance values (e.g., of lighter colors) than other series of bytes of the heatmap 500. The example first plurality of bytes 502 may be determined to be related to a significant feature that significantly contributes to classification of a sample as benign or malware.

The example first plurality of bytes 502 may be used by the example heatmap generator circuitry 206 and/or the example communication circuitry 212 to perform a dimensionality reduction. In some examples, the example heatmap 500 may be used to guide feature selection by identifying bytes and/or groups of bytes that are indicative of malware.

Figure 6:
FIG. 6 is another example explainable artificial intelligence heatmap for a raw byte sequence.

FIG. 6 is an illustration of an example second heatmap 600. The example second heatmap 600 includes a second plurality of bytes 604, a third plurality of bytes 606, and a fourth plurality of bytes 608. The example second plurality of bytes 604 is a region of the example second heatmap 600 that is of a lighter color than the surrounding bytes, contributes greatly to gradient activation of a neural network, and is indicative of a significant feature.

The example third plurality of bytes 606 is lighter than surrounding bytes. However, the example second heatmap 600 is associated with a threshold significance value. The example third plurality of bytes 606 does not meet the threshold significance value, and therefore is not selected for feature reduction and/or further inspection. The example fourth plurality of bytes 608 shows another series of significant bytes.

FIG. 7 is an illustration of an example third heatmap 700 and an example disassembly visualization 704. The example third heatmap 700 includes the example fourth plurality of bytes 702 that are determined to be significant by the example disassembler circuitry 208 of FIG. 2. The example fourth plurality of bytes 702 is selected by the example heatmap generator circuitry 206 and/or the example disassembler circuitry 208 of FIG. 2. The example disassembly visualization 704 includes a column for memory addresses, a column for the raw byte values, and columns for the disassembled instructions. By generating a disassembly of the selected raw bytes, the disassembler circuitry 208 of FIG. 2 can provide a human-understandable representation of the bytes that are contributing significantly to a classification by a neural network.

To confirm the information in the heatmap and/or the disassembly visualization, programmatic and/or manual human review can be used to inspect the significant bytes in the heatmap 700 and the disassembly visualization 704. In some examples, human experts may inspect an XAI heatmap and verify if the bytes in light colors are associated with malware and/or a malware family.

The example disassembly visualization 704 includes disassembly of part of a tiny encryption algorithm (TEA) algorithm. In some examples, a disassembly may be generated from an hview tool. The bytes identified by the XAI example third heatmap (e.g., 61, 9F, AB, 72, BB, 9F, B1) are identified as bytes of interest as the byte sequence is associated with the tea decryption algorithm. Therefore, the fifth plurality of bytes 702 belongs to part of the TEA and are associated with a malware classification. Such a result can confirm a convolutional neural network can learn and identify useful patterns that may be overlooked by humans or other automation techniques.

Figure 8:
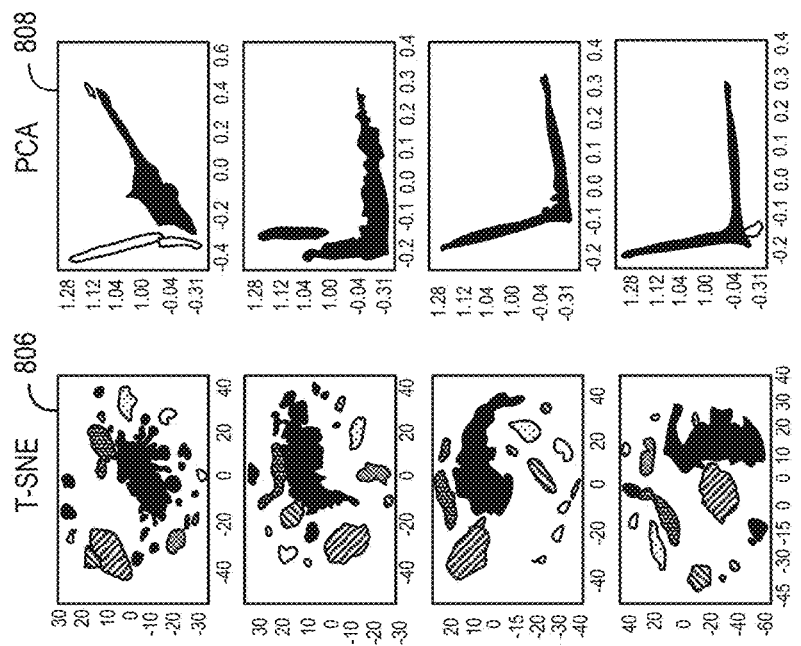
FIG. 8 is an example visualization of a raw byte sequence based on t-distributed stochastic neighbor embedding and principal component analysis.
Figure 8:
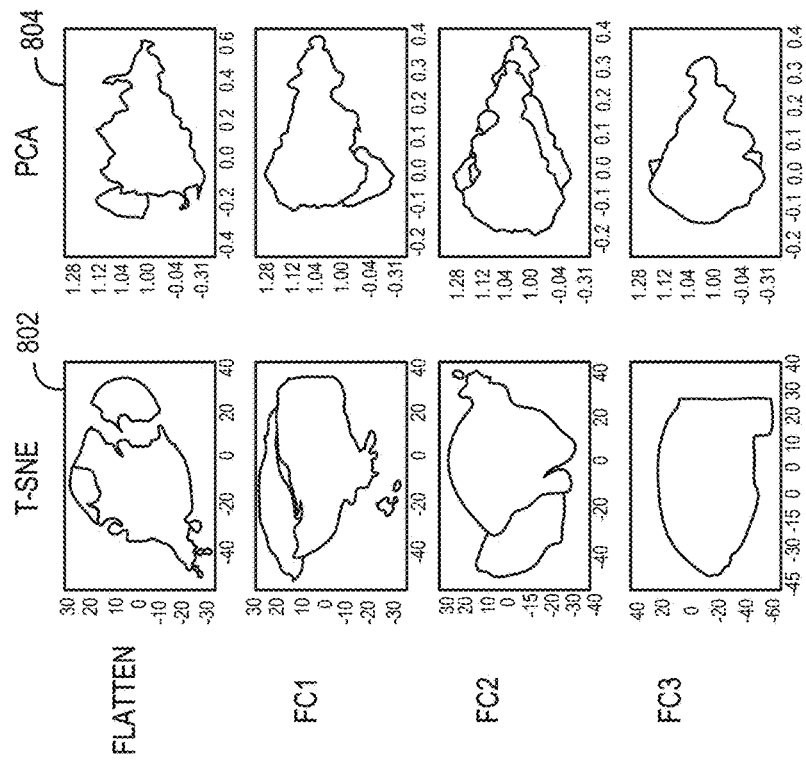

FIG. 8 shows an XAI visualization 800 using t-distributed stochastic neighbor embedding and principal component analysis for before-and-after training visualizations. The example XAI visualization 800 is generated by the example feature visualization circuitry 204. The example feature visualization circuitry 204 generates visualizations for an example flatten layer, an example first fully connected layer ("FC1"), an example second fully connected layer ("FC2"), and an example third fully connected layer ("FC3"). The example feature visualization circuitry 204 generates four visualizations for each layer. First, before training, the example feature visualization circuitry 204 performs t-SNE and PCA on each of the flatten, FC1, FC2, and FC3 layers of a neural network, generating eight graphs. Then, after training, the feature visualization circuitry 204 generates second graphs for the flatten, FC1, FC2, and FC3 layers of the neural network.

A comparison of the first graph 802 to the third graph 806 illustrates separation of the data points into visually identifiable clusters. A comparison of the second graph 804 to the fourth graph 808 illustrates visually identifiable principal components in the fourth graph 808 that were not clearly visible before training in the second graph 1304. The visualizations of FIG. 8 illustrate that training performed by the example training circuitry 210 of FIG. 2 was effective in improving identification of multi-family malware. Thus, after training, the neural network circuitry 202 of FIG. 2 is able to extract useful representations to capture characteristics of different types of malware as shown in different clusters.

A flowchart representative of example machine readable instructions, which may be executed to configure processor circuitry to implement the raw byte analysis circuitry 102 of FIG. 2, is shown in FIGS. 9-10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIG. 9-10, many other methods of implementing the example raw byte analysis circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to generate a heatmap and perform a dimensionality reduction based on the heatmap. The machine readable instructions and/or the operations 900 of FIG. 9 begin at block 902, at which the example communication circuitry 212 of FIG. 2 and/or the example training circuitry 210 of FIG. 2 provides raw bytes to the example neural network circuitry 202 of FIG. 2. For example, the raw bytes provided to the example neural network circuitry 202 of FIG. 2 may be used to classify a malware sample as either malware or benign. In some examples, the raw bytes provided to the neural network circuitry 202 are filtered by manual and/or programmatic feature selection (e.g., by the example heatmap generator circuitry 206 of FIG. 2).

At block 904, the example heatmap generator circuitry 206 generates a heatmap of the raw bytes based on one-dimensional Grad-CAM operations. For example, the heatmap generator circuitry 206 of FIG. 2 may generate a heatmap based on a convolutional layer of the example neural network circuitry 202 of FIG. 2. In some examples, multiple raw byte heatmaps may be generated based on one or more convolutional layers (e.g., the example last layer) of the example neural network circuitry 202 of FIG. 2. Then, the heatmaps can be presented in one or more visualizations comparing the XAI heatmaps to provide better understanding to an AI researcher, for example.

At block 906, The example heatmap generator circuitry 206 of FIG. 2 selects features for dimensionality reduction based on the heatmap. For example, raw bytes from the heatmap may be assigned a significance value indicative of an effect on gradient activations of the example neural network circuitry 202 of FIG. 2. In some examples, the example heatmap generator circuitry may color raw bytes of the example raw byte heatmap based on the significance value (e.g., less significant bytes provided darker colors).

At block 908, the example heatmap generator circuitry 206 of FIG. 2 determines if the selected features are to be further analyzed. For example, the example heatmap generator circuitry 206 of FIG. 2 may provide the features to disassembler circuitry 208 of FIG. 2 for disassembly. In some examples, the heatmap generator circuitry 206 of FIG. 2 may determine the selected features will not undergo further analysis and the instructions continue at block 916. In other examples, the example heatmap generator circuitry 206 of FIG. 2 may determine the selected features are to be further analyzed and the instructions continue at block 910.

At block 910, the example disassembler circuitry 208 of FIG. 2 disassembles the raw bytes provided by the heatmap generator circuitry 206 of FIG. 2. In some examples, the example disassembler circuitry 208 of FIG. 2 generates a visualization of the bytes to be disassembled. The visualization may include a series of bytes to be disassembled, arranged in a column.

At block 912, the example disassembler circuitry 208 of FIG. 2 compares the disassembled raw bytes to known malware. For example, the disassembled bytes may be compared to a database of known malware samples that are stored in the example data storage 214 of FIG. 2. In some examples the disassembled raw bytes may be presented in a visualization and a user can manually review the disassembled raw bytes to determine if the assembly instructions corresponding to the raw bytes are indicative of malware.

At block 914, the example disassembler circuitry 208 of FIG. 2 and/or the example heatmap generator circuitry 206 of FIG. 2 updates the selected features that will be used in a dimensionality reduction. For example, the disassembler circuitry 208 of FIG. 2 may determine ones of a plurality of raw bytes selected by the example heatmap generator circuitry 206 of FIG. 2 may not be indicative of malware and deprioritize such raw bytes in a dimensionality reduction.

The instructions 900 end. In some examples, additional iterations of the instructions 900 may execute. For example, a first dimensionality reduction may be performed based on the instructions 900 to reduce a size of a training data set. Then, the size of the training data set may be reduced further by performing an additional iteration of the instructions 900 to reach a threshold size for storage in the example data storage 214 of FIG. 2.

FIG. 10 is a flowchart representative of example machine readable instructions and/or example operations 1000 that may be executed and/or instantiated by processor circuitry to generate visualizations of raw bytes processed by the example neural network circuitry 202 of FIG. 2. The machine readable instructions and/or the operations 1000 of FIG. 10 begin at block 1002 at which the example training circuitry 210 provides raw bytes to the example neural network circuitry 202 of FIG. 2. For example, the raw bytes provided to the example neural network circuitry 202 of FIG. 2 may be used to train the example neural network circuitry 202 to classify a malware sample as either malware or benign. In some examples, the raw bytes provided to the neural network circuitry 202 are filtered by manual and/or programmatic feature selection.

At block 1004, the example feature visualization circuitry 204 performs a first feature projection on layers of the example neural network circuitry 202. For example, the feature visualization circuitry 204 may generate visualizations based on a flatten layer and a first three fully connected layers of four fully connected layers of the neural network circuitry 202. To reduce a dimensionality of data and transform data into a format suitable for a two-dimensional visualization, the example feature visualization circuitry 204 may perform a dimensionality reduction based on t-SNE and/or PCA.

At block 1006, the example feature visualization circuitry 204 generates a first feature visualization based on the first feature projection. For example, the feature visualization circuitry 204 may generate a two-dimensional graph. As the two-dimensional graph is produced pre-training, the example two-dimensional graph may show a distribution of data samples that do not have a clear differentiation between clean samples and malware samples.

At block 1008, the example training circuitry 210 trains the example neural network circuitry 202. For example, the neural network circuitry 202 may be trained by minimizing a loss function with gradient descent. However, any training algorithm may be used. In some examples, the communication circuitry 212 communicates with a machine learning server to train the example neural network circuitry 202 at a remote server. The trained neural network circuitry 202 may be provided to the example raw byte analysis circuitry 102 for execution with raw byte input.

At block 1010 the example training circuitry 210 provides raw bytes to the example neural network circuitry 202 of FIG. 2. The raw bytes provided to the example neural network circuitry 202 are the same raw bytes that are provided to the example neural network circuitry 202 at block 1002. As the raw bytes are the same, visualizations based on the raw bytes can be directly compared.

At block 1012, the example feature visualization circuitry 204 performs a second feature projection on layers of the example neural network circuitry 202. For example, the feature visualization circuitry 204 may generate visualizations based on a flatten layer and a first three fully connected layers of four fully connected layers of the neural network circuitry 202. To reduce a dimensionality of data and transform data into a format suitable for a two-dimensional visualization, the example feature visualization circuitry 204 may perform a dimensionality reduction based on t-SNE and/or PCA.

At block 1014, the example feature visualization circuitry 204 generates a second feature visualization based on the second feature projection. For example, the feature visualization circuitry 204 may generate a two-dimensional graph. As the two-dimensional graph is produced post-training, the example two-dimensional graph may show a distribution of data samples with significant differentiation between clean samples and malware samples.

At block 1016 the example feature visualization circuitry 204 presents the first and second visualizations. For example, the feature visualization circuitry 204 may generate a third visualization with side-by-side comparisons of the first visualization and the second visualization. The side-by-side comparison can highlight the differences between the first and second visualizations, for example.

FIG. 11 is a block diagram of an example processor platform 1100 structured to execute and/or instantiate the machine readable instructions and/or the operations of FIGS. 9-10 to implement the raw byte analysis circuitry 102 of FIG. 2. The processor platform 1100 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 412 implements the example neural network circuitry 202, the example feature visualization circuitry 204, the example heatmap generator circuitry 206, the example disassembler circuitry 208, the example training circuitry 210, the example communication circuitry 212, and/or the example data storage 214.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus

1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 9-10, may be stored in the mass storage device 1128, in the volatile memory 1114, in the non-volatile memory 1116, and/or on a removable non-transitory computer readable storage medium such as a CD or DVD.

Figure 12:
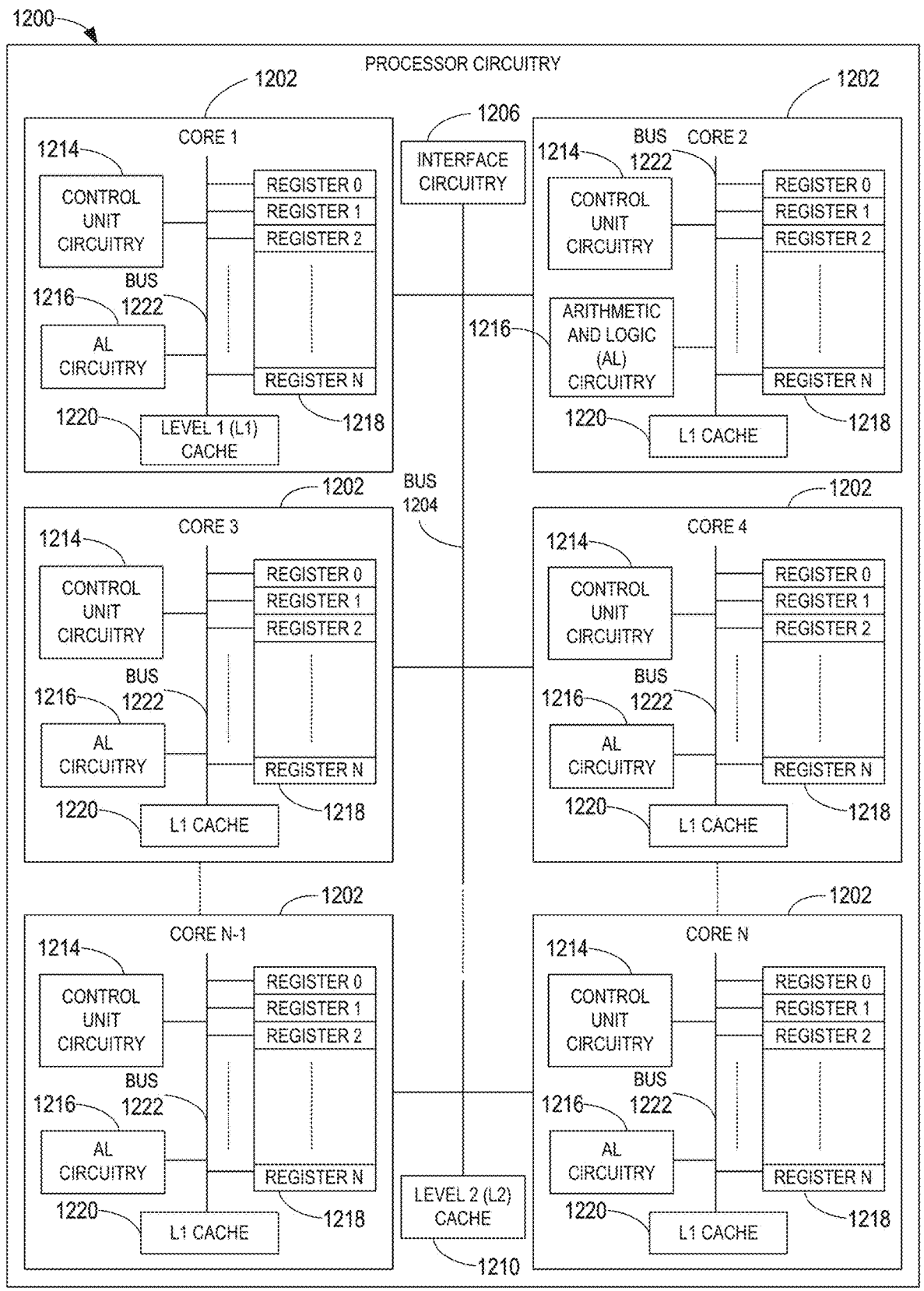
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may be a general purpose microprocessor (e.g., general purpose microprocessor circuitry). The microprocessor 1200 executes some or all of the machine readable instructions of the flowchart of FIGS. 9-10 to effectively instantiate the circuitry of FIG. 2 as logic circuits to perform the operations corresponding to those machine readable instructions. In some such examples, the circuitry of FIG. is instantiated by the hardware circuits of the microprocessor 1200 in combination with the instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIGS. 9-10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
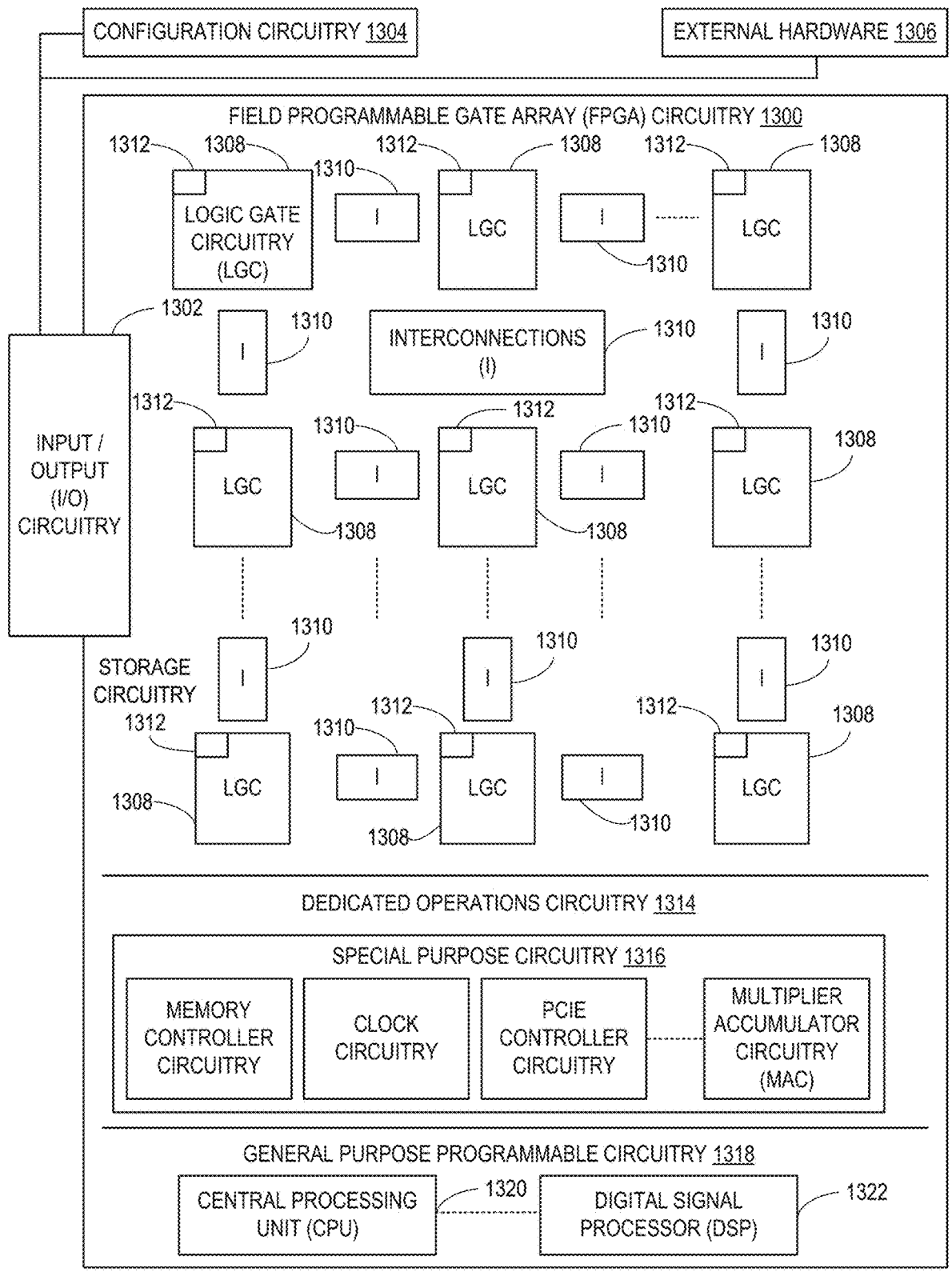
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowchart of FIGS. 9-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowchart of FIGS. 9-10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowchart of FIG. As such, the FPGA circuitry 1300 may be structured to effectively instantiate some or all of the machine readable instructions of the flowchart of FIGS. 9-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 9-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may be implemented by external hardware circuitry. For example, the external hardware 1306 may be implemented by the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations that may correspond to at least some of the machine readable instructions of FIGS. 9-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modem FPGA circuitry may include an onboard CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIG. 9-10 may be executed by one or more of the cores 1202 of FIG. 12, a second portion of the machine readable instructions represented by the flowcharts of FIG. 9-10 may be executed by the FPGA circuitry 1300 of FIG. 13, and/or a third portion of the machine readable instructions represented by the flowcharts of FIG. 9-10 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
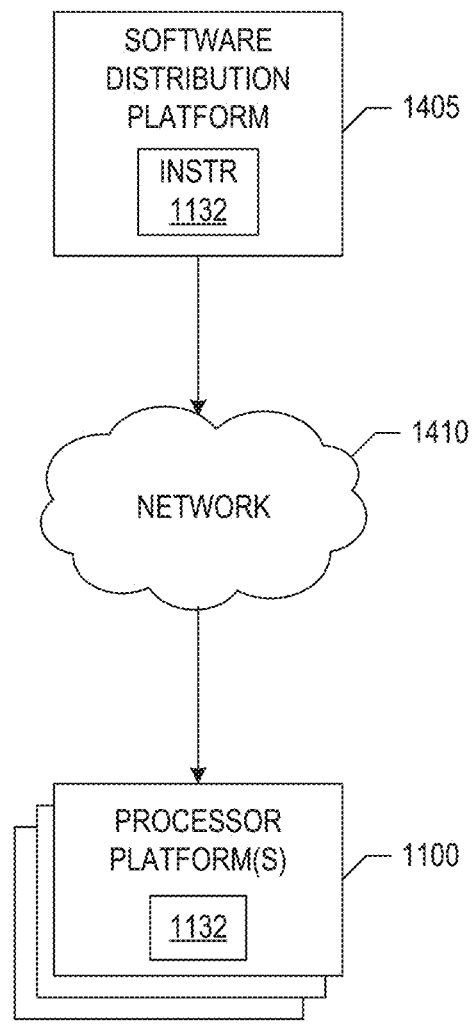
FIG. 14 is a block diagram of an example software distribution platform (e.g., one or more servers) to distribute software (e.g., software corresponding to the example machine readable instructions of FIGS. 9-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 900, 1000 of FIGS. 9-10, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1105. For example, the software, which may correspond to the example machine readable instructions 1132 of FIG. 11, may be downloaded to the example processor platform 400, which is to execute the machine readable instructions 1132 to implement the raw byte analysis circuitry 102. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that improve machine learning based malware detection with raw bytes. Disclosed systems, methods, apparatus, and articles of manufacture improve the efficiency of using a computing device by identifying raw bytes of a sample that contribute significantly to classification and using those features in dimensionality reduction. Disclosed examples build trust in deep learning-based malware classification through visual explanations that make AI models more transparent and improve model optimization and troubleshooting.

Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for machine learning based malware detection and visualization with raw bytes are disclosed herein. Further examples and combinations thereof include the following:

Example 1 includes an apparatus comprising at least one memory, instructions, and processor circuitry to execute the instructions to provide a neural network a plurality of raw bytes for malware classification, generate a visualization of features extracted from the plurality of raw bytes, the visualization generated based on a fully connected layer of the neural network, generate a heatmap for the plurality of raw bytes based on gradient activations of the neural network, the heatmap generated based on a convolutional layer of the neural network, and perform a dimensionality reduction based on features of the plurality of raw bytes identified in the heatmap.

Example 2 includes the apparatus of example 1, wherein the processor circuitry is to execute the instructions to generate the heatmap based on a one-dimensional gradient-weighted class activation mapping.

Example 3 includes the apparatus of any of the previous examples, wherein the heatmap includes the plurality of raw bytes, ones of the plurality of raw bytes assigned a color indicating an importance to the neural network.

Example 4 includes the apparatus of any of the previous examples, wherein the processor circuitry is to execute the instructions to disassemble a subset of the plurality raw bytes, the subset selected based on the heatmap.

Example 5 includes the apparatus of any of the previous examples, wherein the neural network includes four convolutional layers with rectified linear unit activation functions, and four fully connected layers with scaled exponential linear unit activation functions.

Example 6 includes the apparatus of any of the previous examples, wherein the visualization is based on t-distributed stochastic neighbor embedding or principal component analysis of a flatten layer and first three fully connected layers of the four fully connected layers.

Example 7 includes the apparatus of any of the previous examples, wherein the visualization is a first feature visualization, the processor circuitry to execute the instructions to generate a second feature visualization of the neural network before training the neural network with the plurality of raw bytes, train the neural network with the plurality of raw bytes, and generate a third feature visualization comparing the first feature visualization and second feature visualization.

Example 8 includes a non-transitory computer readable storage medium comprising instructions which, when executed by processor circuitry, cause the processor circuitry to provide a neural network a plurality of raw bytes for malware classification, generate a visualization of features extracted from the plurality of raw bytes, the visualization generated based on a fully connected layer of the neural network, generate a heatmap for the plurality of raw bytes based on gradient activations of the neural network the heatmap generated based on a convolutional layer of the neural network, and perform a dimensionality reduction based on features of the plurality of raw bytes identified in the heatmap.

Example 9 includes the non-transitory computer readable storage medium of any of the previous examples, wherein the instructions, when executed, cause the processor circuitry to generate the heatmap based on a one-dimensional gradient-weighted class activation mapping.

Example 10 includes the non-transitory computer readable storage medium of any of the previous examples, wherein the heatmap includes the plurality of raw bytes, ones of the plurality of raw bytes assigned a color indicating an importance to the neural network.

Example 11 includes the non-transitory computer readable storage medium of any of the previous examples, wherein the instructions, when executed, cause the processor circuitry to disassemble a subset of the plurality of raw bytes, the subset selected based on the heatmap.

Example 12 includes the non-transitory computer readable storage medium of any of the previous examples, wherein the neural network includes four convolutional layers with rectified linear unit activation functions, and four fully connected layers with scaled exponential linear unit activation functions.

Example 13 includes the non-transitory computer readable storage medium of any of the previous examples, wherein the visualization is based on t-distributed stochastic neighbor embedding or principal component analysis of a flatten layer and first three fully connected layers of the four fully connected layers.

Example 14 includes the non-transitory computer readable storage medium of any of the previous examples, wherein the visualization is a first feature visualization, and wherein the instructions, when executed, cause the processor circuitry to generate a second feature visualization of the neural network before training the neural network with the plurality of raw bytes, train the neural network with the plurality of raw bytes, and generate a third feature visualization comparing the first feature visualization and the second feature visualization.

Example 15 includes a method comprising providing, by executing an instruction with processor circuitry, a neural network a plurality of raw bytes for malware classification, generating, by executing an instruction with the processor circuitry, a visualization of features extracted from the plurality of raw bytes, the visualization generated based on a fully connected layer of the neural network, generating, by executing an instruction with the processor circuitry, a heatmap for the plurality of raw bytes based on gradient activations of the neural network, the heatmap generated based on a convolutional layer of the neural network, and performing, by executing an instruction with the processor circuitry, a dimensionality reduction based on features of the plurality of raw bytes identified in the heatmap.

Example 16 includes the method of any of the previous examples, further including generating the heatmap based on a one-dimensional gradient-weighted class activation mapping.

Example 17 includes the method of any of the previous examples, wherein the heatmap includes the plurality of raw bytes, ones of the plurality of raw bytes assigned a color indicating an importance to the neural network.

Example 18 includes the method of any of the previous examples, further including disassembling a subset of the plurality of raw bytes, the subset selected based on the heatmap.

Example 19 includes the method of any of the previous examples, wherein the neural network includes four convolutional layers with rectified linear unit activation functions, and four fully connected layers with scaled exponential linear unit activation functions.

Example 20 includes the method of any of the previous examples, wherein the visualization is based on t-distributed stochastic neighbor embedding or principal component analysis of a flatten layer and first three fully connected layers of the four fully connected layers.

Example 21 includes the method of any of the previous examples, wherein the visualization is a first feature visualization, and further including generating a second feature visualization of the neural network before training the neural network with the plurality of raw bytes, training the neural network with the plurality of raw bytes, and generating a third feature visualization comparing the first feature visualization and the second feature visualization.

It is noted that this patent claims priority from U.S. Provisional Patent Application No. 63/214,554, which was filed on Jun. 24, 2021, and is hereby incorporated by reference in its entirety.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for machine-learning based malware detection, comprising:
   at least one memory;
   instructions; and
   processor circuitry to execute the instructions to:
      provide to a neural network a first plurality of raw bytes of malware with a first significance value for malware classification;
      generate a visualization of features extracted from the first plurality of raw bytes of malware, the visualization generated based on a fully connected layer of the neural network;
      generate a heatmap for the first plurality of raw bytes of malware based on gradient activations of the neural network, the heatmap generated based on a convolutional layer of the neural network;
      disassemble the heatmap to identify a second plurality of raw bytes of malware with a second significance value, the second significance value greater than the first significance value; and
      perform a dimensionality reduction based on features of the second plurality of raw bytes of malware identified in the disassembled heatmap to reduce a size of a training data set for the malware classification.

2. The apparatus of claim 1, wherein the processor circuitry is to execute the instructions to generate the heatmap based on a one-dimensional gradient-weighted class activation mapping.

3. The apparatus of claim 1, wherein the heatmap includes the first plurality of raw bytes of malware, and ones of the first plurality of raw bytes of malware are assigned a color indicating an importance to the neural network.

4. The apparatus of claim 1, wherein to disassemble the heatmap the processor circuitry is to execute the instructions to disassemble a subset of the first plurality of raw bytes of malware, the subset selected based on the heatmap.

5. The apparatus of claim 1, wherein the neural network includes four convolutional layers with rectified linear unit activation functions, and four fully connected layers with scaled exponential linear unit activation functions.

6. The apparatus of claim 5, wherein the visualization is based on t-distributed stochastic neighbor embedding or principal component analysis of a flatten layer and first three fully connected layers of the four fully connected layers.

7. The apparatus of claim 1, wherein the visualization is a first feature visualization, and the processor circuitry is to execute the instructions to:
   generate a second feature visualization of the neural network before training the neural network with the second plurality of raw bytes of malware;
   train the neural network with the second plurality of raw bytes of malware; and
   generate a third feature visualization comparing the first feature visualization and second feature visualization.

8. A non-transitory computer readable storage medium for machine-learning based malware detection comprising instructions which, when executed by processor circuitry, cause the processor circuitry to:
   provide to a neural network a first plurality of raw bytes of malware with a first significance value for malware classification;
   generate a visualization of features extracted from the first plurality of raw bytes of malware, the visualization generated based on a fully connected layer of the neural network;
   generate a heatmap for the first plurality of raw bytes of malware based on gradient activations of the neural network, the heatmap generated based on a convolutional layer of the neural network;
   disassemble the heatmap to identify a second plurality of raw bytes of malware with a second significance value, the second significance value greater than the first significance value; and
   perform a dimensionality reduction based on features of the second plurality of raw bytes of malware identified in the disassembled heatmap to reduce a size of a training data set for the malware classification.

9. The non-transitory computer readable storage medium of claim 8, wherein the instructions, when executed, cause the processor circuitry to generate the heatmap based on a one-dimensional gradient-weighted class activation mapping.

10. The non-transitory computer readable storage medium of claim 8, wherein the heatmap includes the first plurality of raw bytes of malware, and ones of the first plurality of raw bytes of malware are assigned a color indicating an importance to the neural network.

11. The non-transitory computer readable storage medium of claim 8, wherein to disassemble the heatmap the instructions, when executed, cause the processor circuitry to disassemble a subset of the first plurality of raw bytes of malware, the subset selected based on the heatmap.

12. The non-transitory computer readable storage medium of claim 8, wherein the neural network includes four convolutional layers with rectified linear unit activation functions, and four fully connected layers with scaled exponential linear unit activation functions.

13. The non-transitory computer readable storage medium of claim 12, wherein the visualization is based on t-distributed stochastic neighbor embedding or principal component analysis of a flatten layer and first three fully connected layers of the four fully connected layers.

14. The non-transitory computer readable storage medium of claim 8, wherein the visualization is a first feature visualization, and wherein the instructions, when executed, cause the processor circuitry to:
   generate a second feature visualization of the neural network before training the neural network with the second plurality of raw bytes of malware;
   train the neural network with the second plurality of raw bytes of malware; and
   generate a third feature visualization comparing the first feature visualization and the second feature visualization.

15. A method for machine-learning based malware detection, comprising:

providing, by executing an instruction with processor circuitry, to a neural network a first plurality of raw bytes of malware with a first significance value for malware classification;

generating, by executing an instruction with the processor circuitry, a visualization of features extracted from the first plurality of raw bytes of malware, the visualization generated based on a fully connected layer of the neural network;

generating, by executing an instruction with the processor circuitry, a heatmap for the first plurality of raw bytes of malware based on gradient activations of the neural network, the heatmap generated based on a convolutional layer of the neural network;

disassembling, by executing an instruction with the processor circuitry, the heatmap to identify a second plurality of raw bytes of malware with a second significance value, the second significance value greater than the first significance value; and performing, by executing an instruction with the processor circuitry, a dimensionality reduction based on features of the second plurality of raw bytes of malware identified in the disassembled heatmap to reduce a size of a training data set for the malware classification.

16. The method of claim 15, further including generating the heatmap based on a one-dimensional gradient-weighted class activation mapping.

17. The method of claim 15, wherein the heatmap includes the first plurality of raw bytes of malware, and ones of the first plurality of raw bytes of malware are assigned a color indicating an importance to the neural network.

18. The method of claim 15, wherein disassembling the heatmap further includes disassembling a subset of the first plurality of raw bytes of malware, the subset selected based on the heatmap.

19. The method of claim 15, wherein the neural network includes four convolutional layers with rectified linear unit activation functions, and four fully connected layers with scaled exponential linear unit activation functions.

20. The method of claim 19, wherein the visualization is based on t-distributed stochastic neighbor embedding or principal component analysis of a flatten layer and first three fully connected layers of the four fully connected layers.

21. The method of claim 15, wherein the visualization is a first feature visualization, and further including:

generating a second feature visualization of the neural network before training the neural network with the second plurality of raw bytes of malware;

training the neural network with the second plurality of raw bytes of malware; and generating a third feature visualization comparing the first feature visualization and the second feature visualization.

* * * * *